US009189694B2

(12) United States Patent
Tonogai et al.

(10) Patent No.: US 9,189,694 B2
(45) Date of Patent: Nov. 17, 2015

(54) IMAGE PROCESSING DEVICE AND IMAGE PROCESSING METHOD

(71) Applicant: OMRON Corporation, Kyoto (JP)

(72) Inventors: Norikazu Tonogai, Nara (JP); Tadashi Hyuga, Osaka (JP); Yoshihisa Minato, Kyoto (JP); Masamichi Oe, Kyoto (JP); Masashi Kurita, Nara (JP)

(73) Assignee: OMRON Corporation, Kyoto (JP)

( * ) Notice: Subject to any disclaimer, the term of this patent is extended or adjusted under 35 U.S.C. 154(b) by 111 days.

(21) Appl. No.: 14/038,173

(22) Filed: Sep. 26, 2013

(65) Prior Publication Data

US 2014/0093172 A1 Apr. 3, 2014

(30) Foreign Application Priority Data

Sep. 28, 2012 (JP) ................. 2012-217683

(51) Int. Cl.
*G06K 9/00* (2006.01)
*G06K 9/34* (2006.01)
*G06K 9/46* (2006.01)
*G06K 9/18* (2006.01)
*G06K 9/72* (2006.01)

(52) U.S. Cl.
CPC ........ *G06K 9/18* (2013.01); *G06K 9/723* (2013.01); *G06K 2209/01* (2013.01)

(58) Field of Classification Search
CPC ............. G06K 9/18; G06K 9/36; G06K 9/72; G06K 9/62; G06K 9/6255; G06K 9/228; G06K 9/22; G06K 9/222; G06K 9/00442; G06K 9/46; G06K 9/723; G06K 9/346; G06K 9/348; G06K 9/6296
USPC ......... 382/181, 182, 229, 173, 177, 309, 310, 382/179, 187, 190, 195, 202, 155, 159, 161, 382/174, 276, 286, 289, 112, 254, 270, 271, 382/272, 224, 228, 178, 176, 226, 311, 189, 382/185; 707/E17.019, E17.02, E17.022, 707/999.004, 999.005, 999.006, 999.003; 358/465, 448, 443

See application file for complete search history.

(56) References Cited

U.S. PATENT DOCUMENTS

| 8,300,942 | B2 * | 10/2012 | Takebe et al. ................. 382/181 |
| 8,750,616 | B2 * | 6/2014 | Wu et al. ....................... 382/177 |
| 8,825,670 | B2 * | 9/2014 | Masuko ......................... 707/748 |
| 8,949,267 | B2 * | 2/2015 | Masuko ......................... 707/769 |
| 2004/0213458 | A1 * | 10/2004 | Kanatsu ........................ 382/181 |
| 2009/0202152 | A1 | 8/2009 | Takebe et al. |

FOREIGN PATENT DOCUMENTS

| JP | 2002183667 A | 6/2002 |
| JP | 2006106931 A | 4/2006 |
| JP | 2009193159 A | 8/2009 |

* cited by examiner

*Primary Examiner* — Sheela C Chawan
(74) *Attorney, Agent, or Firm* — Osha Liang LLP

(57) ABSTRACT

An image processing method for identifying a region in an input image by character recognition, the region coinciding with a predetermined search condition, includes receiving the search condition, the search condition including assignments of plural format character strings, each format character string including an assignment of a character type or a specific character for each character of a recognition target, extracting a character string region becoming a candidate from the input image, calculating a similarity between a character recognition result and the plural format character strings with respect to each group of plural character string regions, the character recognition result being of each character string region included in each group, and determining the group coinciding with the search condition among the groups of plural character string regions according to the calculated similarity.

20 Claims, 16 Drawing Sheets

FIG. 1

| FORMAT CHARACTER STRING | CASE 1 | CASE 2 |
|---|---|---|
| | NON-EXISTENCE | EXISTENCE (FORMAT CHARACTER: ##$) |
| CHARACTER RECOGNITION | 7 B O / 7 8 O | 7 8 O / 7 8 O |
| EFFECT | 8 IS FALSELY RECOGNIZED AS B, O IS FALSELY RECOGNIZED AS 0 | FALSE RECOGNITION IS IMPROVED |

— FORMAT CHARACTER STRING
?: ALL CHARACTERS ARE SET TO RECOGNITION TARGET
: ONLY NUMERICAL CHARACTERS ARE SET TO RECOGNITION TARGET
$: ONLY ALPHABETICAL LETTERS ARE SET TO RECOGNITION TARGET
@: ONLY SIGNS ARE SET TO RECOGNITION TARGET

RECOGNITION RESULT

RECOGNITION RESULT

REMOVE FALSELY-DETECTED REGION

FIG. 4A

```
FORMAT CHARACTER STRING
 F1) $$$$$$@##
 F2) ####@##@##
 F3)$$$$$$
```

FIG. 4B

```
RECOGNITION RESULT
 R1) PEPAAS/02
 R2) 2009/10/02
 R3) ADFSS
 R4) DAAEEE
```

FIG. 4C

COMBINATION OF FORMAT CHARACTER STRING AND
CHARACTER STRING REGION

| F1-R1 | F1-R1 | F1-R1 | F1-R2 |
| F2-R2 | F2-R2 | F2-R3 | F2-R3 |
| F3-R3 | F3-R4 | F3-R4 | F3-R4 |
| 105 | 921 | 575 | 205 |

← GROUP SIMILARITY

COMBINATION HAVING HIGHEST GROUP SIMILARITY IS USED,
AND R3 IS REMOVED

*FIG. 10*

| | 7 | 8 | O |
|---|---|---|---|
| 0 | 8 | 20 | 45 |
| 1 | 12 | 3 | 3 |
| 2 | 20 | 5 | 5 |
| 3 | 5 | 15 | 4 |
| 4 | 3 | 3 | 2 |
| 5 | 2 | 8 | 2 |
| 6 | 1 | 15 | 8 |
| 7 | 50 | 2 | 6 |
| 8 | 3 | 50 | 11 |
| 9 | 15 | 40 | 8 |
| A | 2 | 35 | 5 |
| B | 3 | 45 | 4 |
| C | 3 | 20 | 20 |
| D | 2 | 15 | 25 |
| E | 2 | 16 | 3 |
| F | 2 | 12 | 2 |
| G | 1 | 8 | 12 |
| H | 2 | 5 | 6 |
| I | 8 | 2 | 3 |
| J | 12 | 2 | 2 |
| K | 3 | 3 | 2 |
| L | 2 | 2 | 2 |
| M | 1 | 2 | 2 |
| N | 1 | 3 | 2 |
| O | 15 | 18 | 50 |
| P | 3 | 15 | 8 |
| Q | 1 | 16 | 38 |
| R | 1 | 18 | 7 |
| S | 5 | 22 | 9 |
| T | 12 | 5 | 3 |
| U | 8 | 4 | 12 |
| V | 7 | 3 | 9 |
| W | 2 | 2 | 5 |
| X | 6 | 9 | 2 |
| Y | 16 | 7 | 2 |
| Z | 20 | 2 | 2 |

| FORMAT CHARACTER STRING | SIMILARITY |
|---|---|
| (1) ##$ | 50+50+50=150 |
| (2) $$$$ | 20+45+50−(penalty)=115−(penalty) |
| (3) ### | 50+50+45=145 |

# IMAGE PROCESSING DEVICE AND IMAGE PROCESSING METHOD

BACKGROUND

1. Technical Field

The present invention relates to an image processing device and an image processing method, which identify a region coinciding with a predetermined search condition in an input image by character recognition.

2. Related Art

Nowadays, because of factory automation or traceability enhancement, there is increasing a need to inspect or read a character added to a half-finished product or a product. An image processing device is frequently used for performing the character recognition for the purpose of print inspection or character read of the half-finished product or the product to meet such need. There is a demand to improve performance of the image processing device for performing such character recognition.

As to image processing concerning such character recognition, for example, Japanese Unexamined Patent Publication No. 2002-183667 discloses a character recognition device that sets any character set as a recognition target character set and quickly performs recognition processing at a high recognition rate based on linguistic information. Japanese Unexamined Patent Publication No. 2006-106931 discloses a character string search device that searches a position of an assigned character string in a grayscale image. Japanese Unexamined Patent Publication No. 2009-193159 discloses a region extraction program that can efficiently and correctly perform the character recognition to information expressed by a regular expression in which the number of characters varies.

During character recognition, a character string region may be falsely detected due to a noise or a deviation of a detection position. For example, in a case where the character string or the like across plural lines is identified, it is hard to remove the falsely-detected character string region. In such applications, sometimes the character recognition cannot properly be performed even if any one of the methods disclosed in Japanese Unexamined Patent Publication Nos. 2002-183667, 2006-106931, and 2009-193159 is adopted.

SUMMARY OF THE INVENTION

One or more embodiments of the present invention provides an image processing device and an image processing method, which can identify a group of plural character string regions coinciding with a search condition in an input image.

In accordance with one or more embodiments of the present invention, an image processing device is provided that identifies a region in an input image by character recognition, the region coinciding with a predetermined search condition. The image processing device includes a setting part that receives the search condition. The search condition includes assignments of plural format character strings. Each format character string includes an assignment of a character type or a specific character for each character of a recognition target. The image processing device includes: an extraction part that extracts a character string region becoming a candidate from the input image; a calculation part that calculates a similarity between a character recognition result and the plural format character strings with respect to each group of plural character string regions, the character recognition result being of each character string region included in each group; and a determination part that determines the group coinciding with the search condition among the groups of plural character string regions according to the calculated similarity.

According to one or more embodiments of the present invention, the search condition further includes a relative positional relationship between the plural format character strings, and the calculation part selects the plural character string regions that coincide with the relative positional relationship, and calculates the similarity.

According to one or more embodiments of the present invention, the setting part determines the relative positional relationship between the plural format character strings from input order of the plural format character strings.

According to one or more embodiments of the present invention, the character string region is a region in which a character string is extracted in units of row, and the relative positional relationship indicates a positional relationship between the rows in the character string region of the input image.

According to one or more embodiments of the present invention, the determination part determines the group of character string regions having the highest calculated similarity, and also excludes other character string regions that are not included in the determined group of character string regions from the candidate.

According to one or more embodiments of the present invention, the calculation part calculates the similarity of the group of character string regions from the similarity calculated for each character included in the character string region.

According to one or more embodiments of the present invention, the calculation part decreases the similarity to be calculated when the number of characters included in the target character string region is less than the number of characters assigned by the corresponding format character string.

According to one or more embodiments of the present invention, the setting part sets an initial value of the format character string from the recognition result, the recognition result being acquired by performing the character recognition to a reference image including a character string of a search target.

According to one or more embodiments of the present invention, the setting part receives a change of the initial value of the format character string from a user.

According to one or more embodiments of the present invention, the search condition is displayed using a sign corresponding to each character type.

According to one or more embodiments of the present invention, the format character string includes the assignment for excluding a specific character from the recognition target.

According to one or more embodiments of the present invention, the setting part previously retains the format character string, and sets the selected format character string according to the selection of the user to the search condition.

In accordance with one or more embodiments of the present invention, an image processing method is provided for identifying a region in an input image by character recognition, the region coinciding with a predetermined search condition. The image processing method includes a step of receiving the search condition. The search condition includes assignments of plural format character strings. Each format character string includes an assignment of a character type or a specific character for each character of a recognition target. The image processing method includes steps of: extracting a character string region becoming a candidate from the input image; calculating a similarity between a character recognition result and the plural format character strings with respect to each group of plural character string regions, the character recognition result being of each character string region included in each group; and determining the group coinciding with the search condition among the groups of plural character string regions according to the calculated similarity.

According to one or more embodiments of the present invention, the group of plural character string regions coinciding with the search condition can easily be identified in an input image.

BRIEF DESCRIPTION OF THE DRAWINGS

FIG. 1 is a view illustrating character recognition processing performed by an image processing device according to one or more embodiments of the present invention using a format character string;

FIGS. 4A, 4B, and 4C are views illustrating a processing example by the image processing device according to one or more embodiments of the present invention;

FIG. 10 is a view illustrating group similarity calculation processing performed by the image processing device according to one or more embodiments of the present invention;

DETAILED DESCRIPTION

Figure 2A:
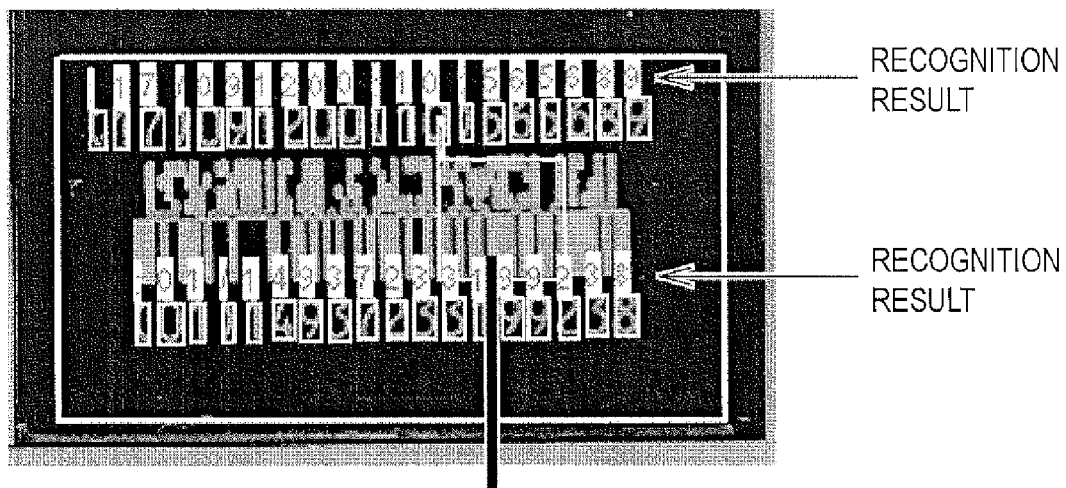
FIGS. 2A and 2B are views illustrating an example of a processing result by the image processing device according to one or more embodiments of the present invention.

Embodiments of the present invention will be described in detail with reference to the drawings. In the drawings, the identical or equivalent component is designated by the identical numeral, and the overlapping description is omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(A. Format Character String)

An image processing device according to one or more embodiments identifies a region coinciding with a predetermined search condition in an input image by character recognition. The search condition includes plural format character strings. First, the format character string of one or more embodiments will be described below.

Typically, the format character string of one or more embodiments assigns a character type or a character for each character of a recognition target. In other words, the format character string assigns a combination of the character types or the characters for the character string of the recognition target.

Specifically, the format character string includes the assignment of the character type for each character of the recognition target (for example, an alphanumeric character, an alphabetical letter, a numerical character, a sign, a special character, a kanji character, a hiragana character, and a katakana character), the assignment of the character of itself (for example, each character of the alphabetical letter "A", "B", . . . , each character of the sign "", "-", . . . , each character of the hiragana character "あ", "い", . . . , and each character of the katakana character "ア", "イ", . . . ), the assignment of a font type, and the assignment of a character size (a font size). In addition to the character, a symbol may be assigned using the format character string.

Typically, the format character string is set according to, for example, a model number of product, a price, a date of manufacture, an identification number, and the like although a print format of the character string added to the recognition target is previously fixed.

In the format character string, it may be configured to be able to set assignment for excluding a specific character from the recognition target. That is, since it is frequently not necessary to set a delimiter (a separating element) connecting the character strings to the recognition target, the delimiter may be skipped in the character recognition.

A recognition rate is improved (a false recognition rate is decreased) by applying such format character string. That is, an image processing device 100 of one or more embodiments restricts a recognition candidate to improve false recognition for a similar character using the previously-set format character string (information on the combination of the character and the character type). In one or more embodiments, it is assumed that a user previously sets the format character string. In the case where the character of itself is assigned, only the assigned character becomes the recognition candidate.

FIG. 1 is a view illustrating character recognition processing performed by the image processing device 100 according to one or more embodiments of the present invention, using the format character string. Referring to FIG. 1, for example, it is assumed that the numerical character, the alphabetical letter, and the sign are distinguished from one another as the character type. A method for defining the format character string (an expression format) may arbitrarily be fixed. In an example in FIG. 1, the signs such as "?", "#", "$", and "@" are used as the format character string. A meaning of each sign is as follows.

?: all the characters are set to the recognition candidate
: only the numerical characters (0 to 9) are set to the recognition candidate
$: only the alphabetical letters (A to Z and/or a to z) are set to the recognition candidate
@: only the signs (such as """, "-", ".", ":", and "¥") are set to the recognition candidate FIG. 1 illustrates the format character string only by way of example. The character type may be expressed using any sign, symbol, icon and the like.

Referring to FIG. 1, it is assumed that the character string "78O (seven, eight, and O)" is printed in a surface of a target object. In a case 1 in FIG. 1, it is assumed that the format character string is not assigned. When the format character string is not assigned, all the characters (the numerical character, the alphabetical letter, and the sign) become the recognition candidate of pattern matching. As a result, for example, the character string "7B0 (seven, B, and zero)" is output as the recognition result. That is, "8 (eight)" is falsely recognized as "B", and "O" is falsely recognized as "0 (zero)".

On the other hand, in a case 2, "##$" (numerical character+ numerical character+alphabetical letter) is assigned as the format character string. Therefore, for the first and second characters included in the extracted character string region, the numerical characters become the recognition candidate of the pattern matching. Similarly, for the third character included in the extracted character string region, the alphabetical letter becomes the recognition candidate of the pattern matching. As a result, a probability of correctly recognizing the character string "7B0" increases.

Thus, in one or more embodiments, the recognition candidate is restricted using the format character string (the information on the combination of the character and the character type), thereby enhancing recognition accuracy.

As used herein, the "character string region" means a batch of regions where one or plural characters are determined to exist, and typically corresponds to a region including a sequence of characters that are disposed adjacent to each other. Assuming that a row direction is a direction in which the characters (the character string) of the recognition target are disposed, the region where the character string is extracted in units of row may be used as the character string region. The region across the plural rows may be extracted as the character string region. For example, when the character string is horizontally written, basically the character string region is extracted along a horizontal direction.

A well-known method can be adopted in the method for extracting such character string region. For example, an input image is projected (for example, a luminance value is integrated) in a first direction (the horizontal direction in the case of the horizontal writing) to identify the row in which the character string is arrayed, and each identified row is projected (for example, the luminance value is integrated) in a second direction (a vertical direction in the case of the horizontal direction) orthogonal to the first direction to identify each character included in each row. Therefore, each character included in each character string region is identified while the character string region is extracted from the input image.

(B. Processing Outline)

Figure 2B:
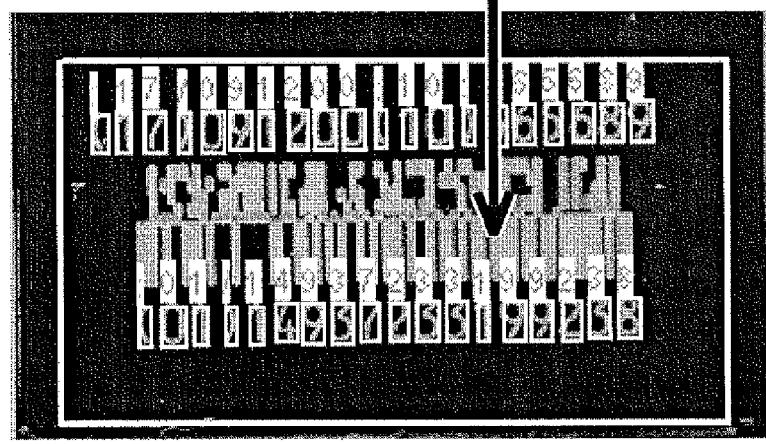

A processing outline of image processing of one or more embodiments will be described below. FIGS. 2A and 2B are views illustrating an example of a processing result by the image processing device 100 according to one or more embodiments of the present invention.

A processing example in FIG. 2A illustrates the character string region and a recognition result, the character string region being extracted from the input image obtained by capturing the image of the target object. In the character string region in FIG. 2A, the character string region located in a middle stage on the right side is falsely detected due to a noise such as a background pattern. In one or more embodiments, such falsely-detected character string region is removed as illustrated in FIG. 2B.

Specifically, the image processing device 100 of one or more embodiments receives a search condition including the assignments of the plural format character strings. The image processing device 100 extracts the character string region that becomes the candidate from the input image of the processing target. The image processing device 100 calculates a similarity between the character recognition result and the plural format character strings with respect to each group of plural character string regions, the character recognition result being of each character string region included in each group, and determines the group that coincides with the search condition among the groups of plural character string regions according to the calculated similarity. At this point, the character string region, which is out of the group of the character string coinciding with the search condition, is removed as the falsely-detected character string region.

That is, the image processing device 100 calculates the similarity of when the previously-set format character string is fitted into the extracted character string region. When the format character string is applied to each of the groups of character string regions, the similarity is calculated to select a combination of the character string regions having high similarity. At this point, the image processing device 100 removes the character string region having the low similarity as the false detection. Sometimes the plural groups of character string regions, which coincide with the search condition, exist in the identical input image. Therefore, one or more groups of character string regions having the relatively high similarity may be extracted from the groups of character string regions, in which the similarity is calculated. The extracted group of character string regions is identified as the region that coincides with the predetermined search condition in the input image.

Figure 3:
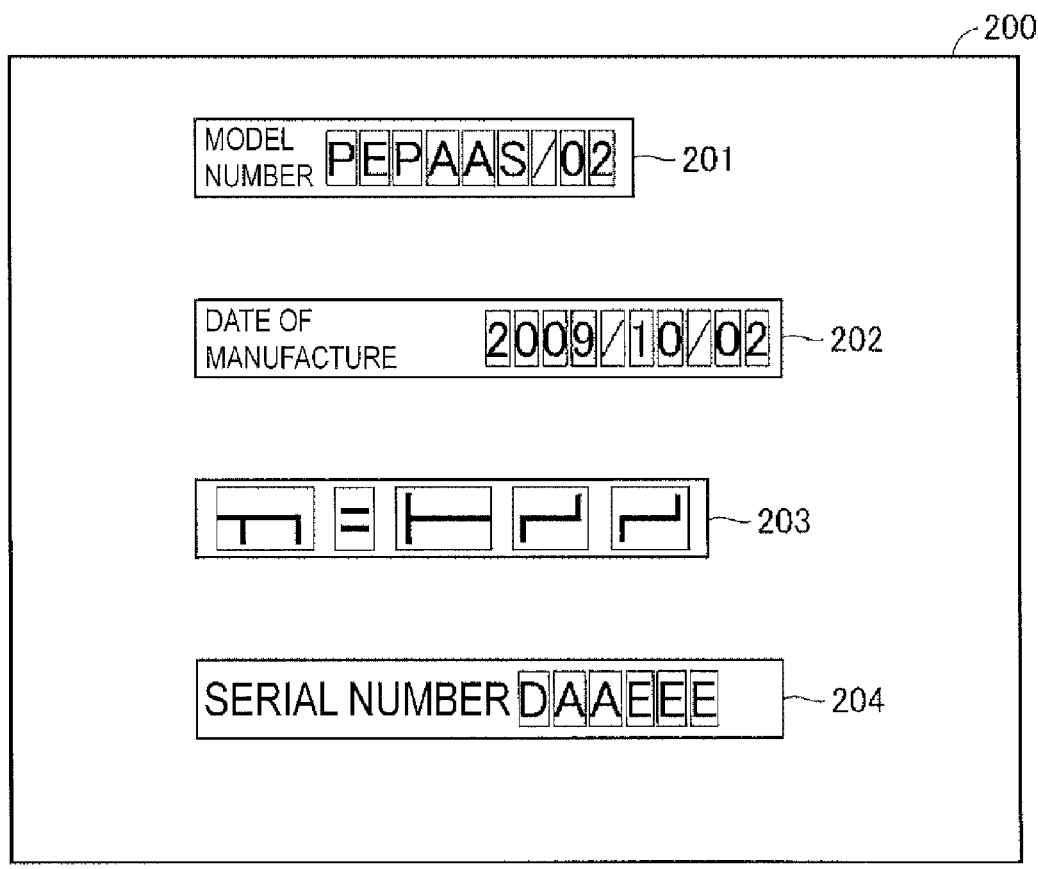
FIG. 3 is a view illustrating an example of a character string region extracted by the image processing device according to one or more embodiments of the present invention.

FIG. 3 is a view illustrating an example of the character string region extracted by the image processing device 100 according to one or more embodiments of the present invention. FIGS. 4A, 4B and 4C are views illustrating a processing example by the image processing device 100 according to one or more embodiments of the present invention.

FIG. 3 illustrates the example in which four character string regions 201 to 204 are extracted from an input image 200. The image processing device 100 extracts each character constituting the character string from each of the extracted character string regions 201 to 204, and performs the character recognition.

FIG. 4A illustrates an example of the previously-set format character string. For example, it is assumed that three format character strings "$$$$$@##", "####@##@##", and "$$$$$$" are set as illustrated in FIG. 4A.

The character recognition is performed to the four character string regions 201 to 204. The three format character strings are applied to each group of plural character string regions. FIG. 4B illustrates a result when the character recognition is performed to the four character string regions 201 to 204.

In the character recognition, the similarity is calculated between the image expressing each character and the character of the recognition candidate. Typically, this similarity is a value indicating a degree of coincidence with an image or a feature quantity of each character included in a previously-defined dictionary. This similarity is calculated using such as a correlation value that is calculated during the character recognition.

Using the similarity in each character, the image processing device 100 calculates the similarity between the character recognition result and the plural format character strings with respect to each group of plural character string regions, the character recognition result being of each character string region included in each group. That is, the image processing device 100 calculates the similarity of the group of character string regions from the similarity calculated for each character included in the character string region. Hereinafter, for the sake of convenience, the similarity of the combination of the character string region and the format character string is referred to as a "group similarity". The specific method for calculating the "group similarity" is described later.

FIG. 4C illustrates an example in which the group similarity is calculated for each combination of the character string region and the format character string. In the example in FIG. 4C, a relative positional relationship among the plural format character strings is set to the search condition. That is, the condition is further imposed that an emergence position of the character string region extracted from the input image corresponds to a setting order of the set plural format character strings. It is not necessary to set the relative positional relationship between the plural format character strings to the search condition. However, when the print format is previously determined, the character recognition can efficiently be performed at higher speed by adding such condition. That is, the image processing device 100 selects the plural character string regions that coincide with the relative positional relationship between the plural format character strings, and calculates the group similarity.

For example, the similarity is respectively calculated for the cases where the format character string "$$$$$@##" (F1) is applied to the recognition result of the character string region 201 (R1), where the format character string "####@##@##" (F2) is applied to the recognition result of the character string region 202 (R2), and where the format character string "$$$$$$" (F3) is applied to the recognition results of the character string region 203 (R3) and the character string region 204 (R4).

In the example in FIG. 4C, the four combinations of the character string regions and the format character strings are obtained because the format character strings (F1), (F2), and (F3) are applied in this order to the character string regions (R1), (R2), (R3), and (R4). The group similarity is calculated for each combination. In the example in FIG. 4C, the combinations in which the format character strings (F1), (F2), and (F3) are each applied to the character string regions (R1), (R2), and (R4) have the highest values of the group similarity. Accordingly, the image processing device 100 identifies the character string regions (R1), (R2), and (R4) (the character string regions 201, 202, and 204 in FIG. 3) as the region that coincides with the search condition, and outputs the recognition result (a text value) for each character string region.

The image processing device 100 determines the group of character string regions having the highest calculated similarity, and excludes other character string regions that are not included in the determined group of character string regions from the candidate. In the example in FIG. 4C, the character string region (R3) (the character string region 203 in FIG. 3) is excluded.

Through the above processing, even if the character string region is falsely detected, an influence of the false detection is removed to be able to enhance the recognition accuracy of the final detection result.

Typically, the character string region is a region in which character string is extracted in units of row from the input image. In this case, a positional relationship between the rows of the character string region in the input image is used as the relative positional relationship.

(C. Hardware Configuration)

Figure 5:
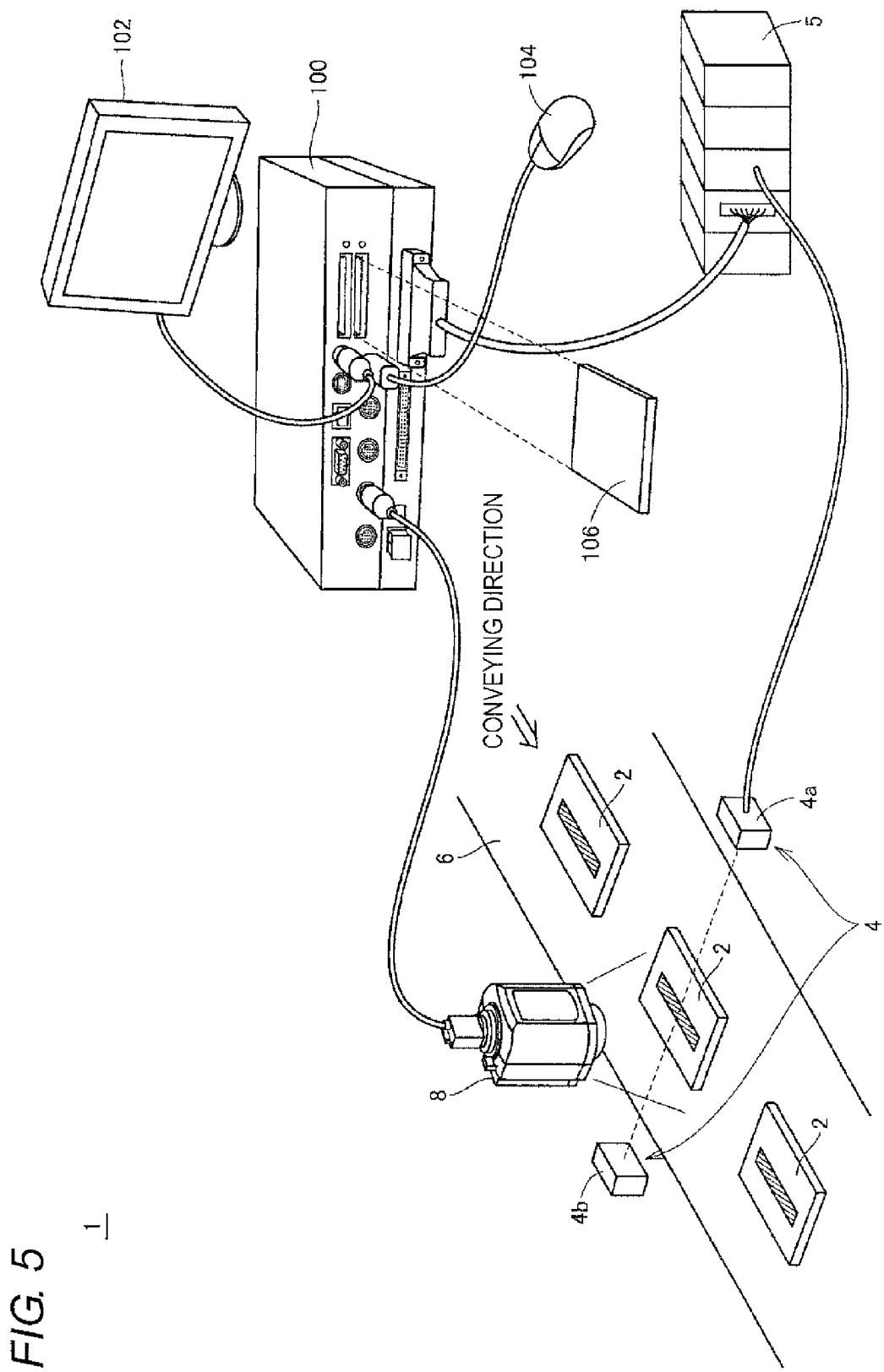
FIG. 5 is a schematic diagram illustrating an entire configuration of a visual sensor system including the image processing device according to one or more embodiments of the present invention.

FIG. 5 is a schematic diagram illustrating an entire configuration of a visual sensor system 1 including the image processing device 100 according to one or more embodiments of the present invention;

Referring to FIG. 5, the visual sensor system 1 incorporated in a production line performs the character recognition to the input image obtained by capturing the image of the target object (a workpiece 2), so as to identify the region that coincides with the predetermined search condition in the input image. The visual sensor system 1 may output a result (text information) in which the identified character string is read.

In the visual sensor system 1, the workpiece 2 is conveyed by a conveying mechanism 6 such as a belt conveyer, and the image of the conveyed workpiece 2 is captured with a camera 8 at predetermined timing. For example, the camera 8 includes an imaging element, such as a CCD (Coupled Charged Device) and a CMOS (Complementary Metal Oxide Semiconductor) sensor, which is divided into plural pixels, in addition to an optical system such as a lens. An illumination mechanism may be further provided to irradiate with light the workpiece 2, of which the image is captured with the camera 8.

The input image obtained by the image capturing of the camera 8 is transmitted to the image processing device 100. The image processing device 100 performs processing including the character recognition (to be described) to the input image received from the camera 8, and displays the character recognition result on a display 102 or outputs the character recognition result to an external device.

A photoelectric sensor 4 disposed at both ends of the conveying mechanism 6 detects that the workpiece 2 reaches a visual field of the camera 8. Specifically, the photoelectric sensor 4 includes a photoreceiver 4a and a projector 4b, which are disposed on an identical optical axis. The photoreceiver 4a detects that the light emitted from the projector 4b is blocked by the workpiece 2, thereby detecting the arrival of the workpiece 2. A trigger signal of the photoelectric sensor 4 is output to a PLC (Programmable Logic Controller) 5. The PLC 5 governs the control of the conveying mechanism 6 while receiving the trigger signal from such as the photoelectric sensor 4.

The image processing device 100 has an operating mode in which measurement processing (the image processing) is performed to the workpiece 2 and a setting mode in which the search condition (the format character string) or a measurement parameter is set.

Typically, the image processing device 100 is a computer including a general-purpose architecture, and executes a previously-installed program (a command code) to provide various functions (to be described). Typically, such programs are distributed while stored in such as a memory card 106.

In the case where the general-purpose computer is used as the image processing device 100, an OS (Operating System)

may be installed in order to provide a basic function of the computer in addition to an application that provides the function of one or more embodiments. In this case, in the program of one or more embodiments, a necessary module, among program modules provided as a part of the OS, may be called at predetermined timing at a predetermined arrangement to perform the processing. That is, the program of one or more embodiments of itself does not include the module as described above, but the processing may be performed in cooperation with the OS. The program of one or more embodiments may have a mode that does not include such part of the module.

Alternatively, the program of one or more embodiments may be provided while being incorporated in a part of another program. In this case too, the program of itself does not include the module included in combined another program, but the processing is performed in cooperation with the other program. That is, the program of one or more embodiments may have a mode incorporated in the other program. A part or all the functions provided by executing the program may be mounted as a dedicated hardware circuit.

Figure 6:
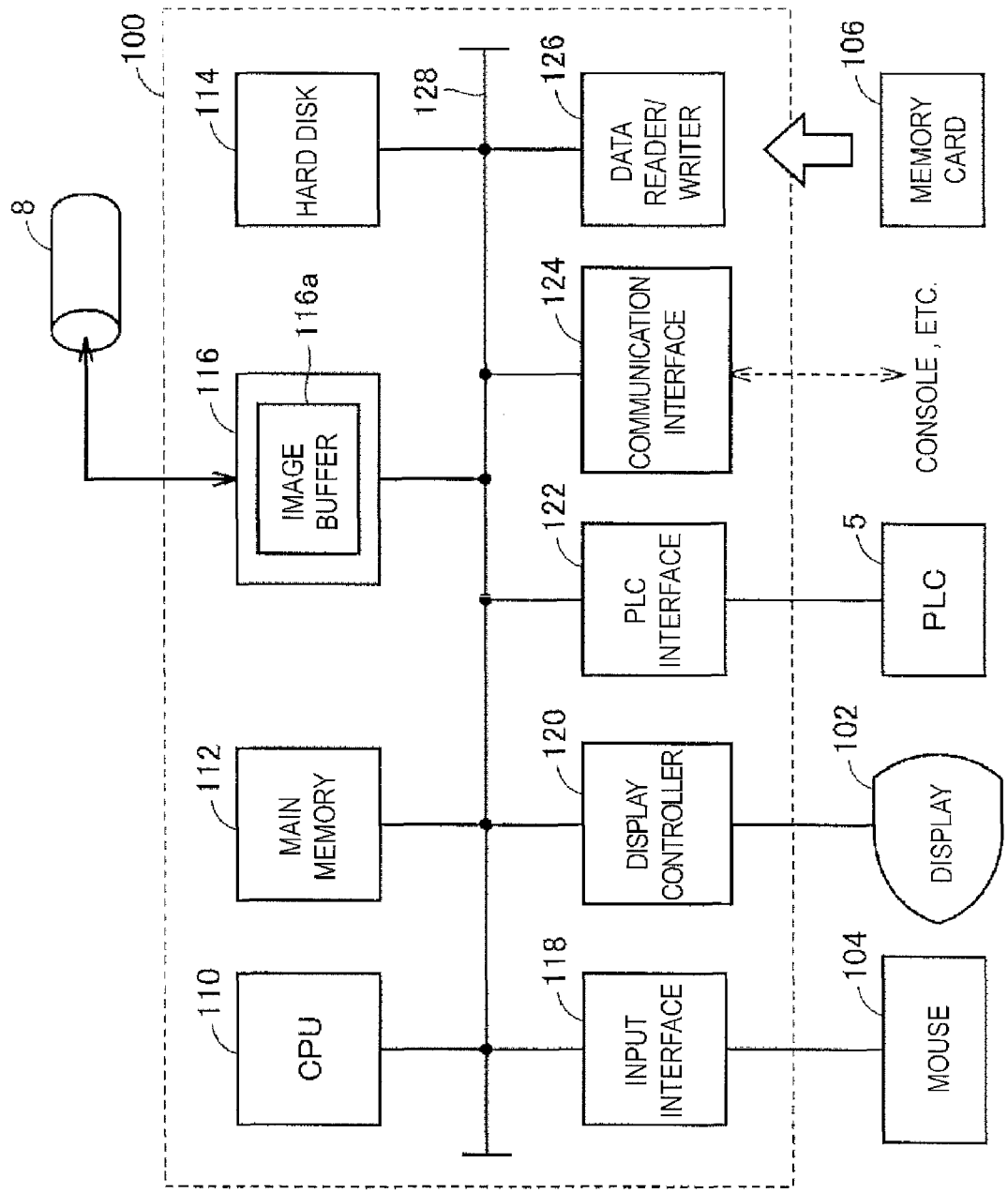
FIG. 6 is a schematic configuration diagram of the image processing device according to one or more embodiments of the present invention.

FIG. 6 is a schematic configuration diagram of the image processing device 100 according to one or more embodiments of the present invention. Referring to FIG. 6, the image processing device 100 includes a CPU (Central Processing Unit) 110 that is of an arithmetic processor, a main memory 112 and a hard disk 114, which are of a storage part, a camera interface 116, an input interface 118, a display controller 120, a PLC interface 122, a communication interface 124, and a data reader/writer 126. These parts are each connected to one another through a bus 128 so as to be able to conduct data communication with one another.

The CPU 110 expands the programs (codes) stored in the hard disk 114 into the main memory 112 to execute the programs in predetermined order, thereby performing various calculation. Typically, the main memory 112 is a volatile storage device such as a DRAM (Dynamic Random Access Memory), and the input image captured with the camera 8, various parameters and the like are stored in the main memory 112 in addition to the program read from the hard disk 114. A semiconductor storage device such as an SSD (Solid-State Drive) may be used in addition to or instead of the hard disk 114.

The camera interface 116 mediates data transmission between the CPU 110 and the camera 8. That is, the camera interface 116 is connected to the camera 8 that generates the image data by capturing the image of the workpiece 2. More specifically, the camera interface 116 can be connected to at least one camera 8, and includes an image buffer 116*a* that temporarily accumulates the image data from the camera 8. When a predetermined number of image data frames are accumulated in the image buffer 116*a*, the camera interface 116 transfers the accumulated pieces of image data to the main memory 112. The camera interface 116 provides an imaging command to the camera 8 in response to an internal command generated by the CPU 110.

The input interface 118 mediates the data transmission between the CPU 110 and an input part such as a mouse 104, a keyboard, and a touch panel. That is, the input interface 118 receives an operation command, which is provided by a user operating the input part.

The display controller 120 is connected to the display 102 that is of a typical example of a display device, and notifies the user of the image processing result of the CPU 110. That is, the display controller 120 is connected to the display 102 to control the display of the display 102.

The PLC interface 122 mediates the data transmission between the CPU 110 and the PLC 5. More specifically, the PLC interface 122 transmits information on a state of the production line controlled by PLC 5 and information on the workpiece to the CPU 110.

The communication interface 124 mediates the data transmission between the CPU 110 and a console (or a personal computer or a server device) or the like. Typically, the communication interface 124 includes Ethernet (registered trademark), a USB (Universal Serial Bus) or the like. As described later, the program downloaded from a distribution server may be installed on the image processing device 100 through the communication interface 124 instead of installing the program stored in the memory card 106 on the image processing device 100.

The data reader/writer 126 mediates the data transmission between the CPU 110 and the memory card 106 that is of a storage medium. That is, the memory card 106 is distributed while the program to be executed by the image processing device 100 is stored therein, and the data reader/writer 126 reads the program from the memory card 106. The data reader/writer 126 writes the image data obtained by the camera 8 and/or the processing result of the image processing device 100 in the memory card 106 in response to the internal command of the CPU 110. The memory card 106 includes a general-purpose semiconductor storage device such as CF (Compact Flash (registered trademark)) and SD (Secure Digital), a magnetic storage medium such as a flexible disk, or an optical storage medium such as a CD-ROM (Compact Disk Read Only Memory).

As needed basis, other output devices such as a printer may be connected to the image processing device 100.

In the image processing device 100 in FIGS. 5 and 6, by way of example, the function to receive various settings and the function to perform the character recognition are mounted on the identical device. Alternatively, these functions may be mounted on the separate devices. In this case, the respective devices coordinate with each other to implement the functions of one or more embodiments as what is called an image processing system. The technical scope of the present invention includes any embodiment as long as the embodiment has the configuration described in the claims, or equivalents thereof.

(D. Functional Configuration)

Figure 7:
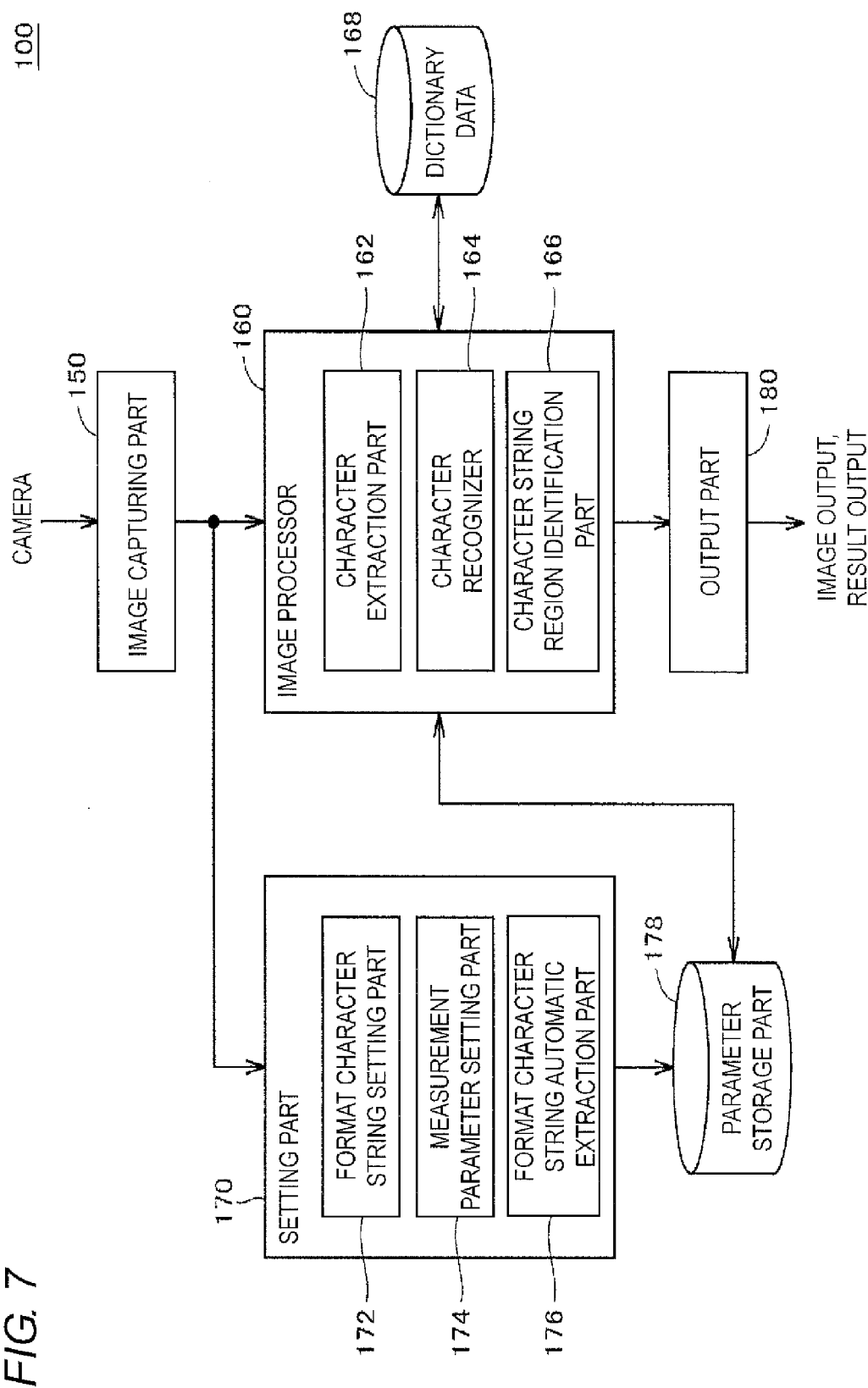
FIG. 7 is a schematic diagram illustrating a functional configuration of the image processing device according to one or more embodiments of the present invention.

A functional configuration that implements the image processing of one or more embodiments will be described below. FIG. 7 is a schematic diagram illustrating a functional configuration of the image processing device 100 according to one or more embodiments of the present invention. Typically, each function in FIG. 7 is implemented such that the CPU 110 (FIG. 6) executes the program (the code) stored in the hard disk 114 (FIG. 6).

Referring to FIG. 7, the image processing device 100 includes an image capturing part 150, an image processor 160, a setting part 170, and an output part 180 as the functional configuration.

The image capturing part 150 acquires the input image, which is generated such that the camera 8 captures the image of the subject. The acquired input image is output to the image processor 160. Additionally, sometimes the setting part 170 refers to the input image.

The image processor 160 identifies the region, which coincides with the predetermined search condition in the input image by the character recognition, by performing the image processing as described above to the input image from the image capturing part 150. More specifically, the image processor 160 includes a character extraction part 162, a character recognizer 164, and a character string region identification part 166.

The character extraction part 162 extracts the character string region that becomes the candidate from the input image. As described above, the character string region is extracted using the method for such as projecting the luminance value as described above. The character extraction part 162 extracts the character string region by referring to the measurement parameter stored in the parameter storage part 178.

The character recognizer 164 performs the character recognition to each candidate in the extracted character string region. At this point, the character recognizer 164 performs the character recognition by referring to previously-set dictionary data 168. The character recognizer 164 calculates the group similarity by applying the format character string to any combination of the character string regions. That is, the character recognizer 164 calculates the similarity between the character recognition result and the plural format character strings with respect to each group of plural character string regions, the character recognition result being of each character string region included in each group. At this point, the character recognizer 164 calculates the similarity (the group similarity) of the group of character string regions from the similarity calculated for each character included in the character string region. The character recognizer 164 accesses a parameter storage part 178 to refer to the format character string stored in the parameter storage part 178.

Character string region identification part 166 identifies the region that coincides with the search condition based on the group similarity calculated by the character recognizer 164. That is, the character string region identification part 166 determines the group that coincides with the search condition among the groups of plural character string regions according to the calculated similarity. At the same time, the character string region identification part 166 determines the group of character string regions having the highest calculated group similarity, and excludes other character string regions that are not included in the determined group of character string regions from the candidate.

The output part 180 outputs the group of character string regions identified by the character string region identification part 166 and the read text value as the recognition result. The output part 180 may output the whole image of the identified character string region.

The setting part 170 receives the format character string as the search condition from such as the user, and also receives the user's assignment for the measurement parameter. In response to the user's operation, the setting part 170 stores the format character string and the measurement parameter in the parameter storage part 178. Examples of the measurement parameter include a character color (a parameter assigning a color of the character of the recognition target), a print type (a parameter assigning an expression format of the character of the recognition target) a dot spacing (a parameter indicating a vertical or horizontal spacing between dots constituting the character of the recognition target), a filter size (a parameter assigning a size of a noise reduction filter), a character thickness threshold (a parameter assigning a thickness of the character of the recognition target), rotation variation correction (a rotation variation of the character over a predetermined range is set to a search range), an italic type variation correction (an italic type variation of the character over the predetermined range is set to the search range), and rim deletion correction (a black portion that is in contact with a measurement region is excluded as the noise from a read candidate).

More specifically, the setting part 170 includes a format character string setting part 172, a measurement parameter setting part 174, and a format character string automatic extraction part 176. The format character string setting part 172 provides a user interface screen for receiving the format character string, and also receives the assignment of the user interface screen from the user. The measurement parameter setting part 174 provides a user interface screen for receiving setting/adjustment of the measurement parameter, and also receives the assignment of the user interface screen from the user.

The format character string automatic extraction part 176 automatically extracts the format character string from a test image (an image acquired by capturing an image of a test sample). Such automatic extraction function of the format character string assists the user to input the format character string.

(E. Processing Procedure)

A processing procedure of the image processing of one or more embodiments will be described below.

E1: Entire Processing

Figure 8:
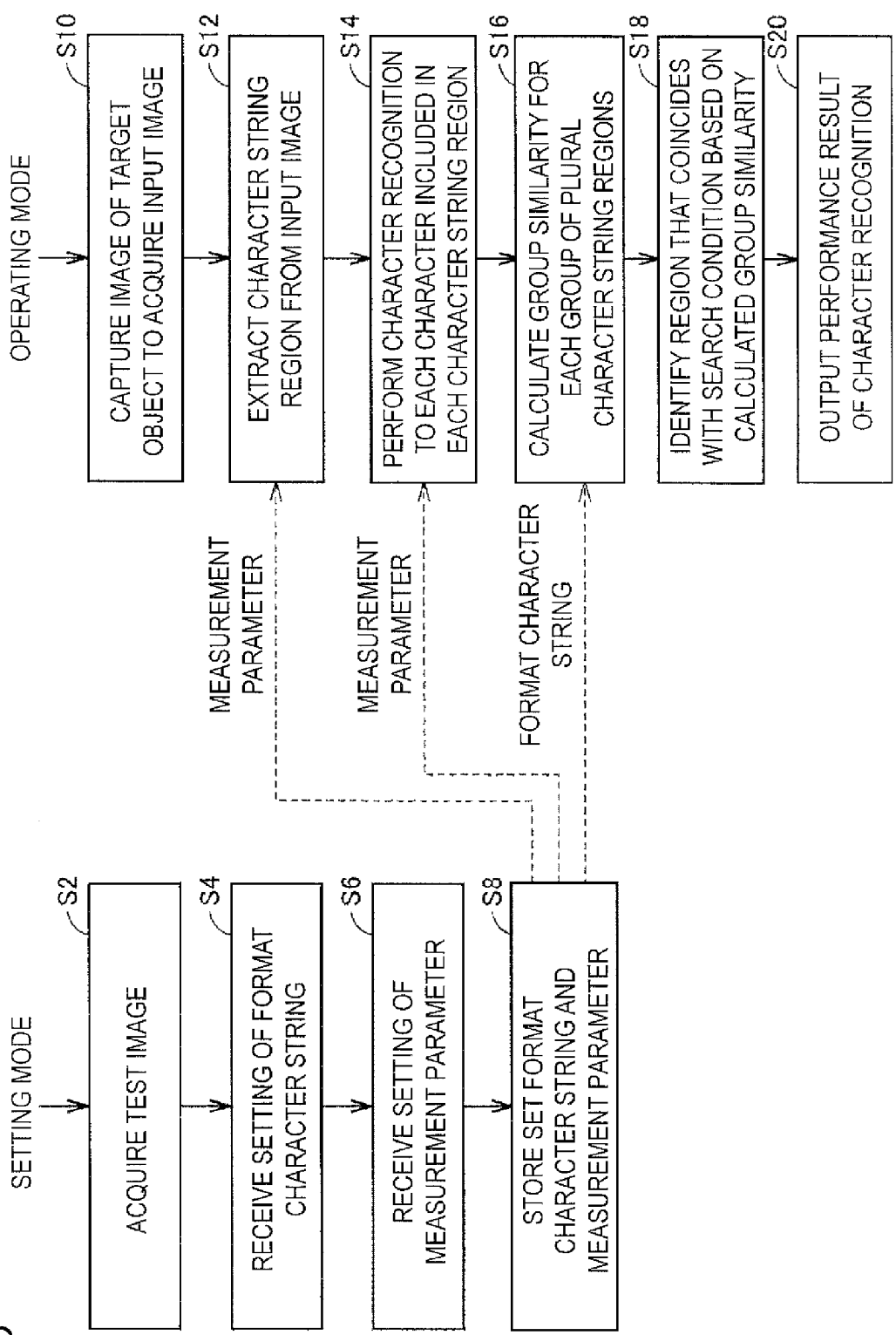
FIG. 8 is a flowchart illustrating a processing procedure of image processing performed by the image processing device according to one or more embodiments of the present invention.

FIG. 8 is a flowchart illustrating the processing procedure of the image processing performed by the image processing device 100 according to one or more embodiments of the present invention. FIG. 8 illustrates both the processing in the setting mode in which the format character string or the measurement parameter is set and the processing in the operating mode in which the measurement processing (the image processing) is performed to the workpiece 2.

Referring to FIG. 8, in the setting mode, the image processing device 100 acquires the test image (Step S2). The test image is the image, which is acquired by disposing the target object (the test sample) including the character string of the recognition target in the visual field range of the camera 8, and capturing the image of the target object with the camera 8.

Then, the image processing device 100 receives the setting of the format character string from the user (Step S4), and also receives the setting of the measurement parameter from the user (Step S6). The image processing device 100 then stores the set format character string and measurement parameter as a setting value (Step S8).

Then, when the operating mode is started, the image processing device 100 acquires the input image by capturing the image of the target object in response to some sort of trigger signal (Step S10). Then the image processing device 100 extracts the character string region from the input image (Step S12). The image processing device 100 performs the character recognition to each character included in each extracted character string region (Step S14), and calculates the group similarity for each group of plural character string regions (Step S16). The image processing device 100 identifies the region that coincides with the search condition based on the calculated group similarity (Step S18). The image processing device 100 outputs a performance result of the character recognition (Step S20).

The pieces of processing in Steps S10 to S20 are repeated as long as the operating mode is selected.

(E2: Operating Mode)

Figure 9:
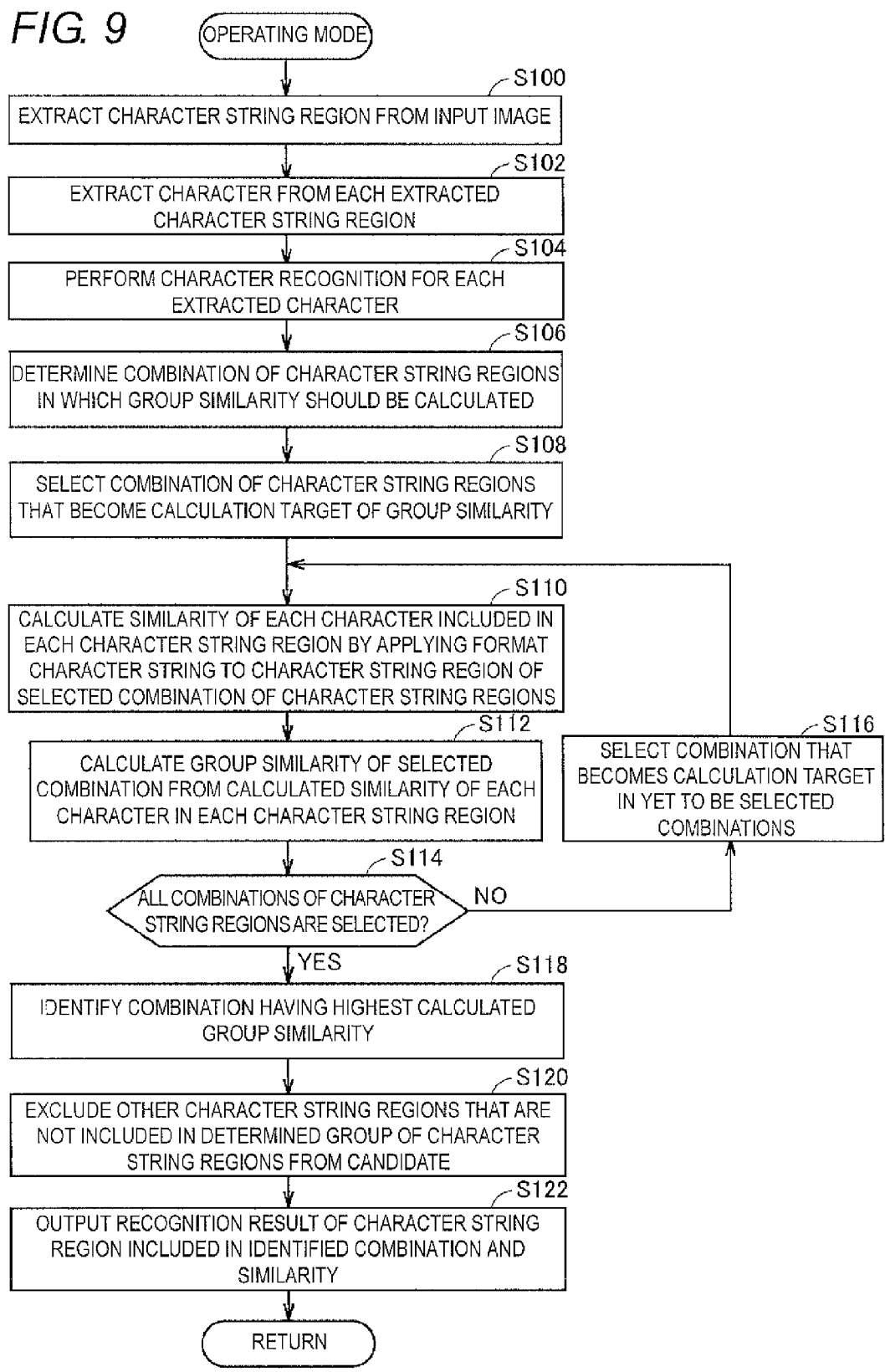
FIG. 9 is a flowchart illustrating a processing procedure in an operating mode performed by the image processing device according to one or more embodiments of the present invention.

Next, the processing procedure in the operating mode will be described in detail. FIG. 9 is a flowchart illustrating the processing procedure in the operating mode performed by the image processing device 100 according to one or more embodiments of the present invention.

Referring to FIG. 9, the image processing device 100 extracts the character string region from the input image (Step S100). The image processing device 100 extracts the character from each extracted character string region (Step S102).

Then the image processing device 100 performs the character recognition for each extracted character (Step S104). In one or more embodiments, the similarity is calculated between each character and all the character candidates included in the dictionary data in order to calculate the group similarity in Step S104. That is, the similarity is respectively calculated between the target character and the alphabetical letters (A to Z), the numerical characters (0 to 9), and the signs (such as """, "-", ".", ":", and "¥").

The image processing device 100 determines the combination of the character string regions in which the group similarity should be calculated (Step S106). Then, in the determined combinations, the image processing device 100 selects the combination of the character string regions that become a calculation target of the group similarity (Step S108).

The image processing device 100 applies the format character string to the character string region of the selected combination of the character string regions, and calculates the similarity of each character included in each character string region (Step S110). That is, the image processing device 100 calculates the similarity of each character based on the format character string. For example, when "#" is the character type that is adapted to a certain character, only the numerical characters (0 to 9) become the recognition candidate, and the numerical character having the highest similarity to the target character and its similarity are output as the recognition result. Similarly, when "$" is the character type that is adapted to a certain character, only the alphabetical letter (A to Z) become the recognition candidate, and the alphabetical letter having the highest similarity to the target character and its similarity are output as the recognition result.

The image processing device 100 calculates the group similarity of the selected combination from the similarity calculated for each character in each character string region (Step S112). Typically, a summation of the similarities of each character in the character string regions is calculated as the group similarity of the combination.

The image processing device 100 determines whether or not all the combinations of the character string regions are selected (Step S114). When the combination that is yet to be selected exists (NO in Step S114), the combination of the character string regions that become the calculation target is selected in the unselected combinations of the character string regions (Step S116). The pieces of processing from Step S110 are performed.

When all the combinations of the character string regions are already selected (YES in Step S114), the image processing device 100 identifies the combination having the highest calculated group similarity (Step S118), and also excludes other character string regions that are not included in the determined group of character string regions from the candidate (Step S120). The image processing device 100 outputs the recognition result of the character string region included in the identified combination and the similarity (Step S122).

(F. Group Similarity Calculation Processing)

The similarity calculated for each character included in the character string region and the group similarity calculation processing will be described below.

FIG. 10 is a view illustrating the group similarity calculation processing performed by the image processing device 100 according to one or more embodiments of the present invention. FIG. 10 illustrates the similarity that is calculated by performing the character recognition to the character string "78O (seven, eight, and O)". As described above, the similarities to all the recognition candidates are calculated in the first stage. It is considered that three format character strings ((1) "##$", (2) "$$$$", and (3) "###") are applied to the recognition result of this character recognition.

When the first format character string "##$" is applied, the recognition candidate is restricted to the numerical character for the first and second characters, the character having the highest similarity thereamong (in the example, "7" and "8" respectively) is identified, and the similarity of the character ("50" in both the case) is extracted. The recognition candidate is restricted to the alphabetical letter for the third character, the character having the highest similarity thereamong (in this case, "O") is identified, and the similarity of the character ("50") is extracted. As a result, 50+50+50=150 is calculated as the similarity.

When the second format character string "$$$$" is applied, the recognition candidate is restricted to the alphabetical letter for the first to third characters, the character having the highest similarity thereamong (in the example, "Z", "B", and "O" respectively) is identified, and the similarity of the character ("20", "45", and "50" respectively) is extracted. At this point, although the format character string includes the assignment of four characters, the similarity of the fourth character may be regarded as "0" because only the three characters are extracted from the character string region of the candidate. Alternatively, the point may be deducted as a penalty since the character was not extracted. That is, the penalty may be imposed in the case where the number of characters included in the character string region does not reach the number of characters assigned by the format character string. In other words, the image processing device 100 decreases the calculated similarity in the case where the number of characters included in the target character string region is less than the number of characters assigned by the corresponding format character string.

By thus imposing the penalty, under the corresponding format character string, a feature quantity having the low similarity emerges, so as to become hardly selected, which allows the false recognition rate to be decreased.

Finally, when the third format character string "###" is applied, the recognition candidate is restricted to the numerical character for the first to third characters, the character having the highest similarity thereamong (in the example, "7", "8", and "0" respectively) is identified, and the similarity of the character ("50", "50", and "45" respectively) is extracted. The third format character string "###" does not indicates the original format of the character string of the recognition target. As a result, third format character string "###" has lower similarity as compared with the case where the first format character string "##$" is applied.

In an example in FIG. 10, the method for calculating the similarity to the one character string region is described for the sake of convenience. Alternatively, the summation of the similarities of the character string regions included in the corresponding combination may be calculated as the group similarity.

As to such method for calculating the group similarity from the summation of the similarities, an average value and/or a minimum value of the similarity to the character string region included in the group may be used instead of the method in which the summation of the similarities is used. In the case where any one of the character string regions does not adapt to the corresponding format character string, the use of the minimum value facilitates the exclusion of the combination thereof.

In the character string recognized using the format character string, because the sign (such as """, "-", ".", ":", and "¥") is frequently used as the delimiter (the separating element), the sign may be excluded from the recognition target, namely, the sign may be skipped in the character recognition.

As described above, the relative positional relationship between the plural format character strings may be set to the search condition. That is, the combination of the plural character string regions may be constructed using the information on the positional relationship.

(G. User Interface)

Next, an example of a user interface provided by the image processing device 100 of one or more embodiments will be described below.

G1: Setting of Format Character String

Figure 11:
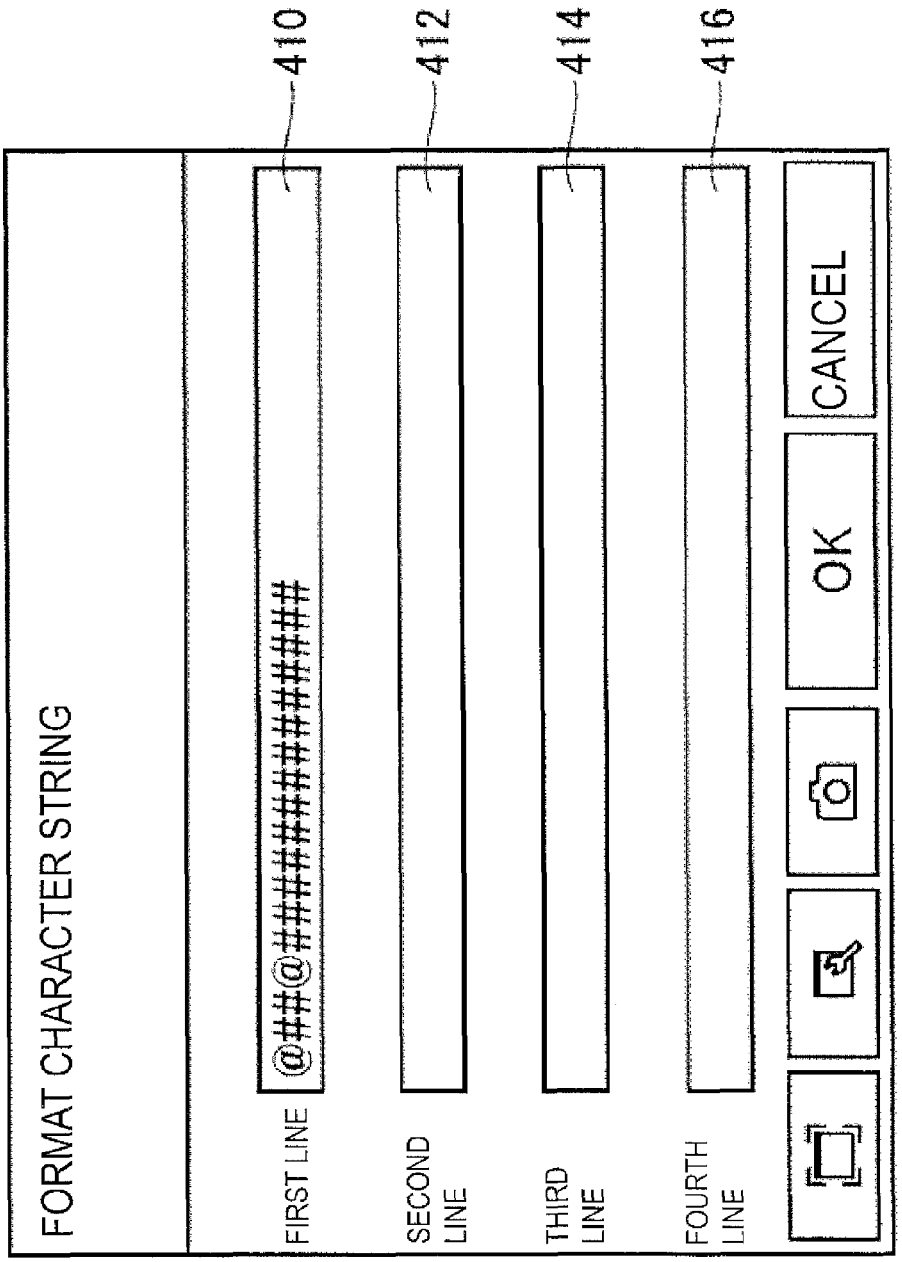
FIG. 11 is a view illustrating an example of a user interface screen provided by the image processing device of one or more embodiments for setting a format character string.

FIG. 11 is a view illustrating an example of a user interface screen 400A, which is provided by the image processing device 100 of one or more embodiments for setting the format character string. In the user interface screen 400A in FIG. 11, the format character strings can be set to the four character string regions, respectively. That is, the user interface screen 400A includes four format character string input regions 410, 412, 414, and 416.

The user selects any of the format character string input regions to input the target format character string. At this point, the format character string may directly be input using the input device such as the keyboard, or alternatively the following format character string inputting user interface screen may be provided.

Figure 12:
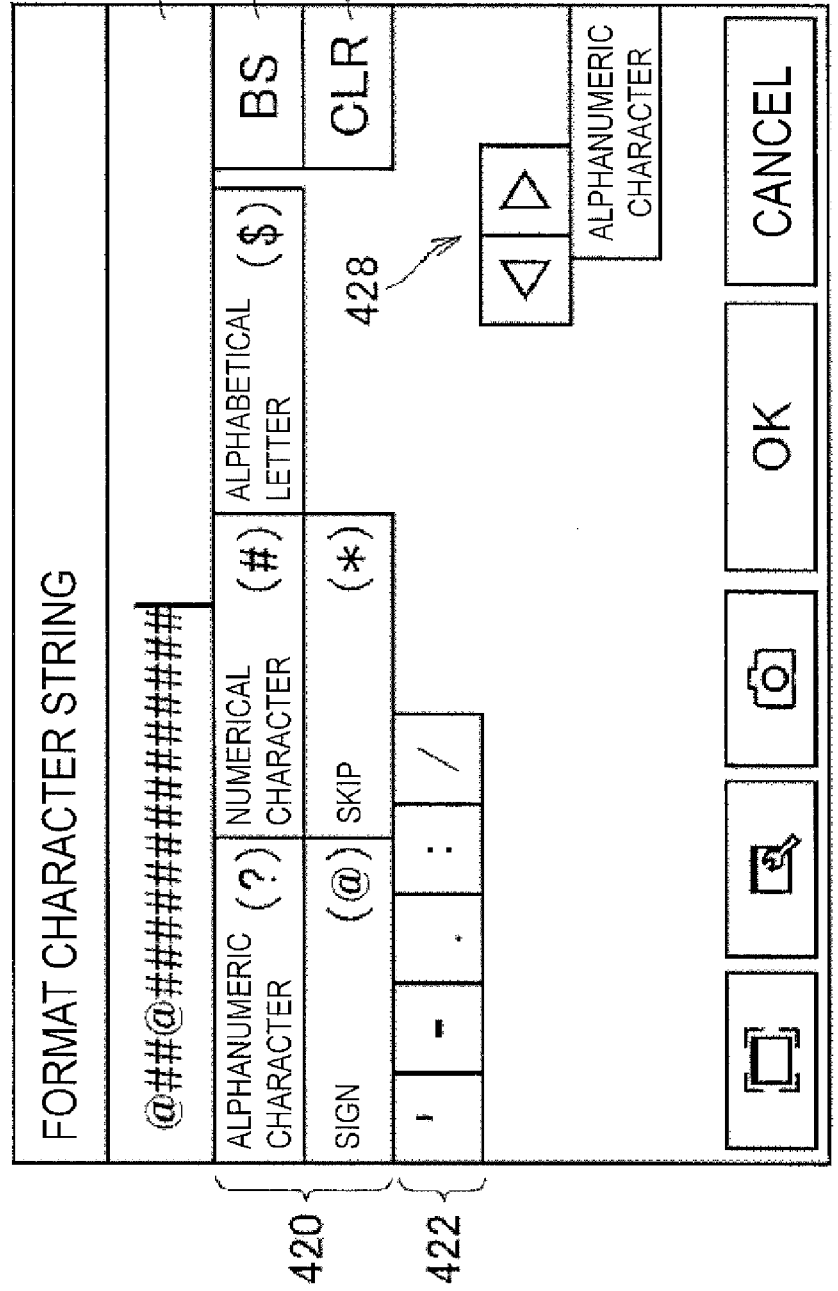
FIG. 12 is a view illustrating an example of the user interface screen provided by the image processing device of one or more embodiments for setting the format character string.

FIG. 12 is a view illustrating an example of a user interface screen 400B, which is provided by the image processing device 100 of one or more embodiments for setting the format character string. The user interface screen 400B in FIG. 12 is displayed by selecting any of the format character string input regions 410, 412, 414, and 416 in the user interface screen 400A in FIG. 11.

In the user interface screen 400B in FIG. 12, there are displayed side by side, namely on the identical screen, a format character string input region 410 indicating the currently-input format character string, plural objects 420 that are correlated with plural assignable character types respectively, and plural objects 422 that are correlated with the assignable signs. When the user selects either of the objects 420 and 422, the format character string corresponding to the selected object is added.

Thus, the user may directly assign the combination of the character types or the characters as the format character string.

The currently-set format character strings are displayed in the format character string input region 410 using the sign corresponding to each character type. That is, the format character string is defined by the signs such as "#", "$", and "@". In each object 420 of the user interface screen 400B in FIG. 12, the sign (for example, signs such as "?" and "#") corresponding to the character type is displayed together with a message (for example, display such as the "alphanumeric character" and the "numerical character") indicating the correlated character type such that the meaning of the sign can be understood at first glance.

The message is thus added to the object 420 such that the meaning of the correlated character type can be understood at first glance, and the sign indicating the corresponding character type is also added to the object 420. Therefore, the user can easily understand a content of the currently-set format character string displayed in the format character string input region 410 even if the user does not previously learn the meaning of each sign.

In the user interface screen 400B, objects are also displayed in order to edit the currently-set format character string. For example, there are disposed an object 424 correlated with a backspace operation (an operation to delete the character immediately before a cursor), an object 426 correlated with a clear operation (an operation to delete all the currently-set format character strings), and an object 428 correlated with an operation to move the cursor.

The relative positional relationship between the plural format character strings may be determined based on the positional relationship among the format character string input regions 410, 412, 414, and 416 in FIG. 11. For example, the search condition may be used in which the format character string input to the format character string input region 410 is located above the format character string input to the format character string input region 412 on the input image.

In one or more embodiments, the search condition thus includes the relative positional relationship between the plural format character strings. The image processing device 100 selects the plural character string regions that coincide with the relative positional relationship, and calculates the similarity. The relative positional relationship between the plural format character strings may be determined from the input order of the plural format character strings.

The relative positional relationship between the format character strings may directly be assigned. At this point, the relative positional relationship may be assigned using a special sign.

Instead of the configuration in which the user directly assigns the format character string, the format character string (such as a date) having a high use frequency may previously be prepared in the image processing device 100 and arbitrarily selected by the user. That is, the image processing device 100 may previously retain the format character string and set the selected format character string to the search condition according to the user's selection.

G2: Automatic Extraction of Format Character String

In the case where the many characters constitute the character string of the recognition target, work to set the format character string as described above possibly becomes troublesome. Therefore, the format character string may automatically be extracted from the test image (the image acquired by capturing the image of the test sample). More specifically, the character recognition is performed to the input image acquired by capturing the image of the test sample, and the candidate of the format character string is automatically generated from the character recognition result thus obtained. Additionally, the user properly corrects and changes the automatically-generated candidate of the format character string to set the desired format character string (the information on the combination of the characters or the character types). The format character string automatic extraction part 176 in FIG. 7 automatically extracts the format character string. Such automatic extraction function of the format character string assists the user to input the format character string.

Figure 13:
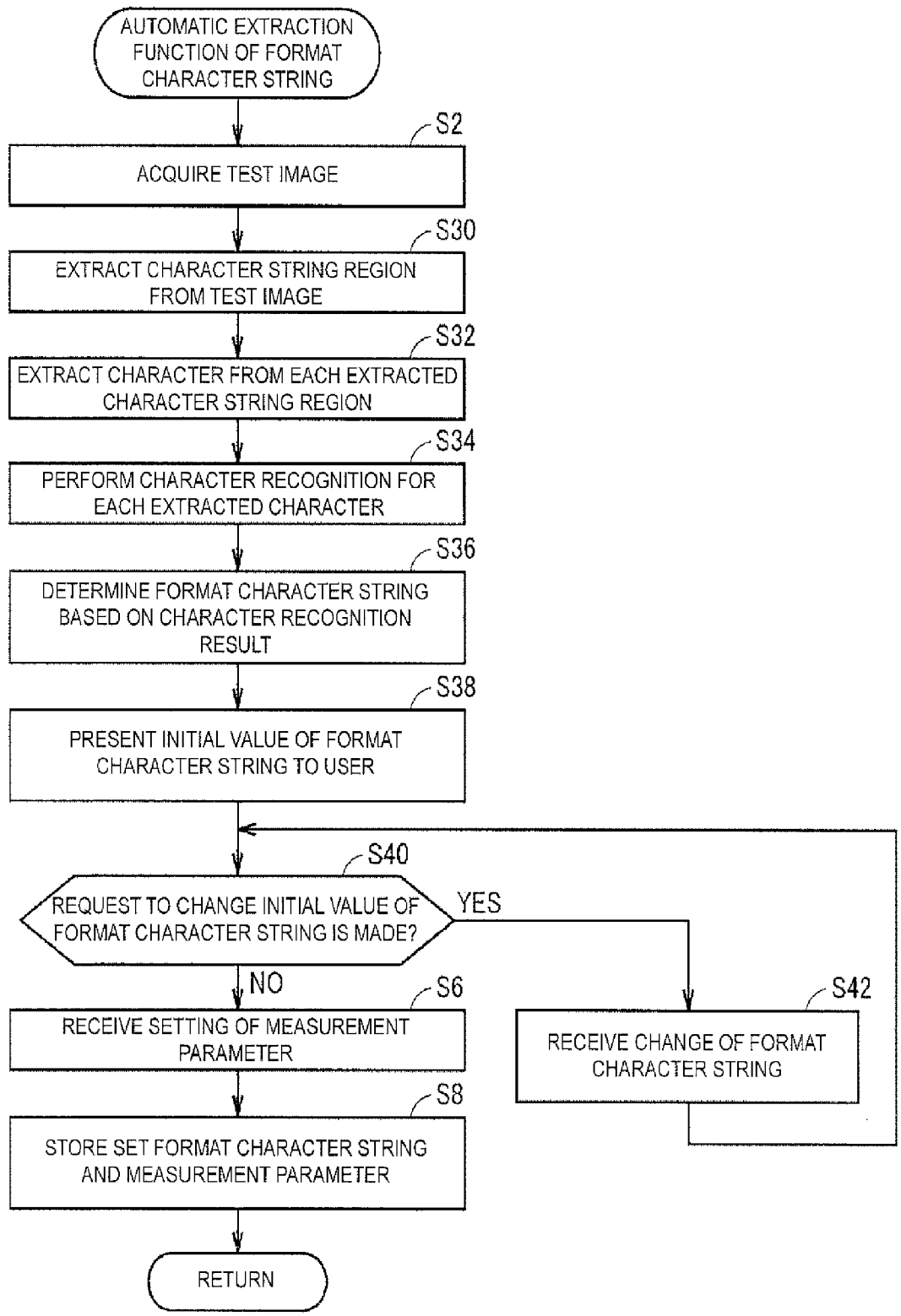
FIG. 13 is a flowchart illustrating a processing procedure, which is related to a format character string automatic extraction function and provided by the image processing device according to one or more embodiments of the present invention.

FIG. 13 is a flowchart illustrating a processing procedure, which is related to a format character string automatic extraction function and provided by the image processing device 100 according to one or more embodiments of the present invention. In the flowchart in FIG. 13, the processing identical to that of the flowchart in FIG. 8 is designated by the identical step number.

Referring to FIG. 13, the image processing device 100 acquires the test image (Step S2). The image processing device 100 extracts the character string region from the test image (Step S30), and also extracts the character from each extracted character string region (Step S32). Then, the image processing device 100 performs the character recognition for each extracted character (Step S34). The image processing device 100 determines the format character string based on the character recognition result (Step S36), and presents the determined format character string as the initial value to the user (Step S38).

Subsequently, the image processing device 100 determines whether or not a request is made to change the initial value of the format character string (Step S40). When the request is made to change the initial value of the format character string (YES in Step S40), the image processing device 100 receives the change of the format character string from the user (Step S42). In response to the user instruction, the image processing device 100 corrects the currently-set format character string. The pieces of processing from Step S40 are repeated.

When the request is not made to change the initial value of the format character string (NO in Step S40), namely, when a response is received that the user agrees with the initial value of the format character string, the image processing device 100 receives the setting of the measurement parameter from the user (Step S6). The image processing device 100 stores the set format character string and measurement parameter as a setting value (Step S8).

Figure 14A:
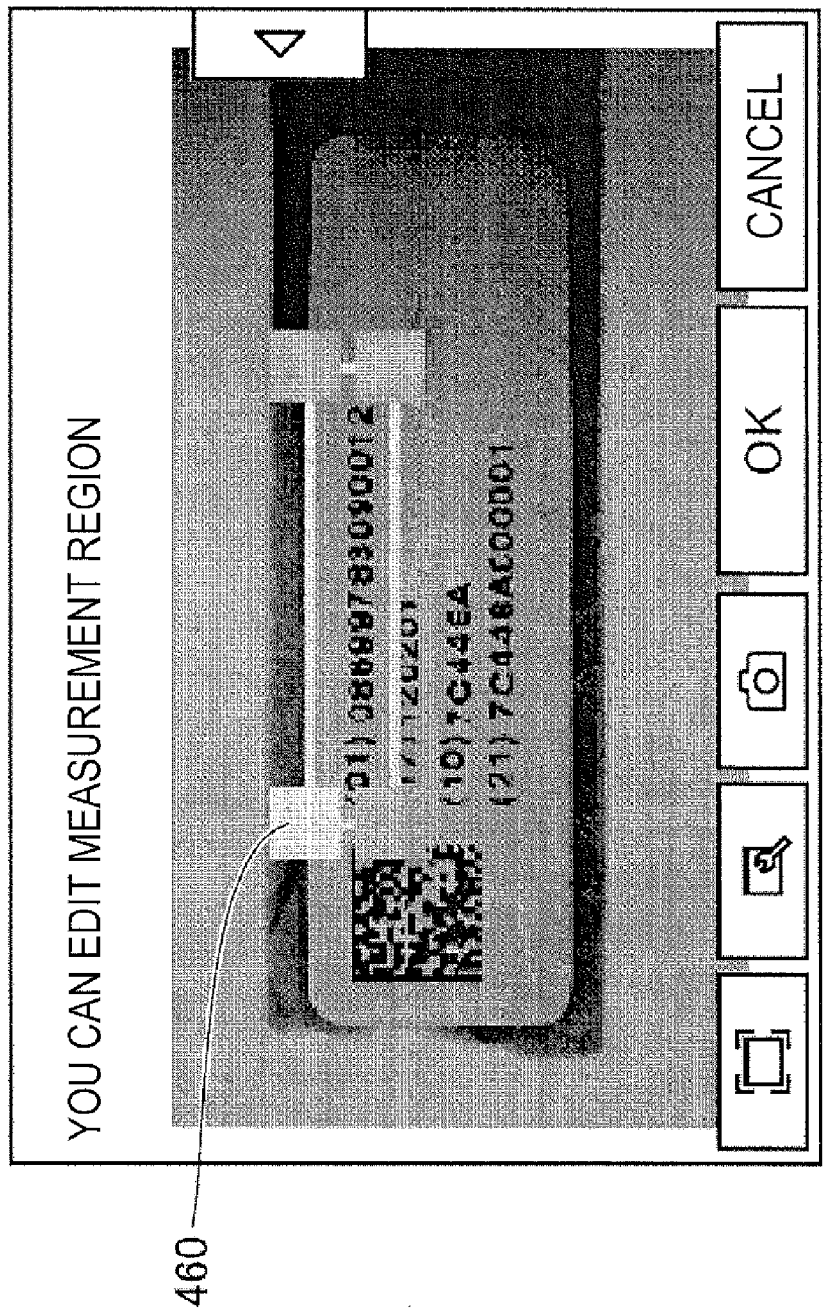
FIGS. 14A and 14B are views illustrating an example of the user interface screen, which is related to automatic extraction of the format character string and provided by the image processing device of one or more embodiments.
Figure 14B:
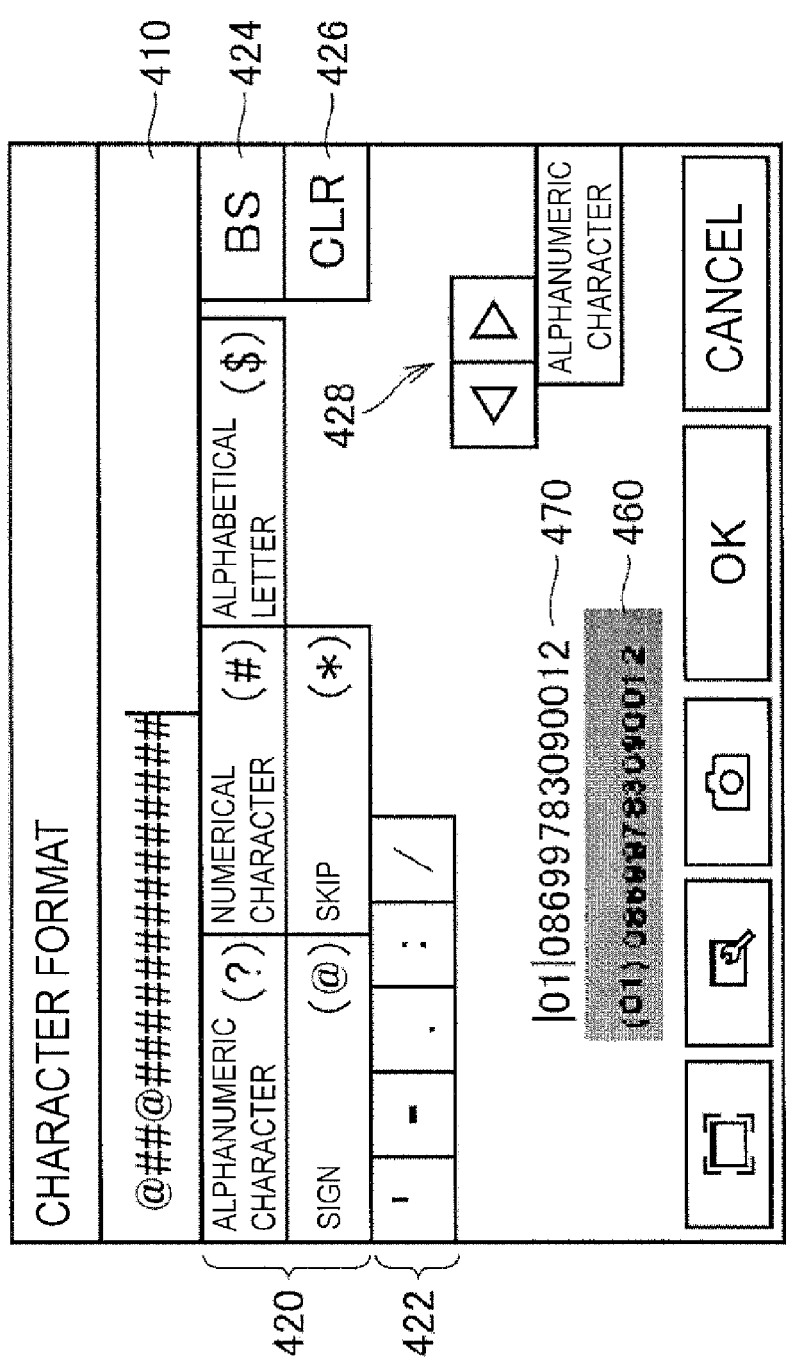

FIGS. 14A and 14B are views illustrating an example of a user interface screen 400C, which is related to the automatic extraction of the format character string and provided by the image processing device 100 of one or more embodiments. Referring to FIG. 14A, the user first acquires the test image by capturing the image of the test sample, and assigns a character string region 460 of the recognition target to the acquired test image.

Then the character recognition is performed to the assigned character string region 460. The character type of each character is determined based on the recognition result acquired by performing the character recognition, and the determined character type of each character is set to the initial value of the format character string. A user interface screen 400D in FIG. 14B is presented to the user. In the user interface screen 400D, the initial value of the format character string is displayed in the format character string input region 410. At the same time, the image in the character string region 460 set to the test image is additionally displayed on the identical screen, and a format character string 470 is also additionally displayed, the format character string 470 indicating the result of the character recognition performed to the image in the character string region 460. The user selects such as the object 420 or the object 422 while referring to these pieces of information, thereby performing the necessary correction or editing to the initial value of the format character string. That is, the image processing device 100 receives the change of the initial value of the format character string from the user.

Thus, the image processing device 100 sets the initial value of the format character string from the recognition result, which is acquired by performing the character recognition to a reference image (the test image) including the character string of the search target.

G3: Format Character String Setting User Interface

The format character string may be set while confirming the application state of the set format character string.

Figure 15:
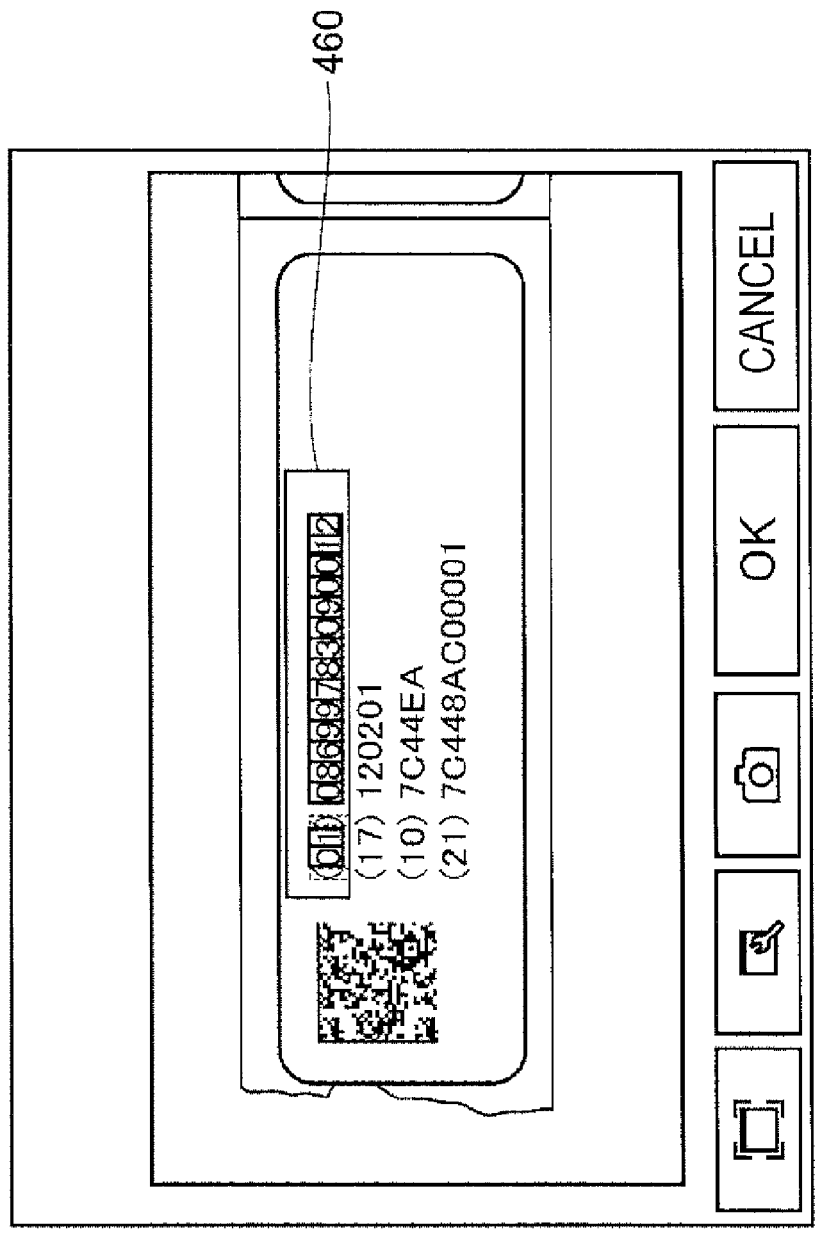
FIG. 15 is a view illustrating an example of the user interface screen, which is related to a setting of the format character string and provided by the image processing device of one or more embodiments.

FIG. 15 is a view illustrating an example of a user interface screen 400E, which is related to the setting of the format character string and provided by the image processing device 100 of one or more embodiments. In the user interface screen 400E in FIG. 15, the character string region 460 of the recognition target is set to the test image, the set format character string is applied to the set character string region 460, and the character recognition result is presented. More specifically, each character extracted from the character string region 460 set on the test image is indicated by a frame, and displayed in a mode indicating the character type of the character in the frame by a display mode of each frame. The user confirms the display to determine whether the character region is correctly extracted.

In setting the format character string, the result obtained by applying the format character string to the test image is presented to the user, and also the user may edit the format character string while confirming the result.

(H. Advantage)

According to one or more embodiments, even if the character string region is falsely detected in the input image, the falsely-detected character string region can properly be removed by applying the format character string. Therefore, the recognition accuracy can be enhanced.

It should be considered that one or more embodiments disclosed herein is example only in all points, and is not restrictive. The scope of the present invention is indicated by not the above description but the claims, and it is intended that the present invention includes the meanings equivalent to the claims and all the changes within the claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing device that identifies a region in an input image by character recognition, the region coinciding with a predetermined search condition, the image processing device comprising:
    a setting part that receives the search condition,
        wherein the search condition includes assignments of plural format character strings, and
        wherein each format character string including an assignment of a character type or a specific character for each character of a recognition target;
    an extraction part that extracts one or more character string regions as candidates from the input image;
    a calculation part that calculates similarities for a plurality of combinations of character recognition results from the character string regions and the plural format character strings,
        wherein a total number of the character recognition results included in each of the combinations is limited to a total number of the plural format character strings assigned via the setting part; and
    a determination part that determines one of the combinations coinciding with the search condition based on the calculated similarities.

2. The image processing device according to claim 1, wherein the search condition further includes a relative positional relationship between the plural format character strings, and
    wherein the calculation part selects the plural character string regions that coincide with the relative positional relationship, and calculates the similarities.

3. The image processing device according to claim 2, wherein the setting part determines the relative positional relationship between the plural format character strings from input order of the plural format character strings.

4. The image processing device according to claim 3, wherein the character string region is a region in which a character string is extracted in units of row, and wherein the relative positional relationship indicates a positional relationship between the rows in the character string region of the input image.

5. The image processing device according to claim 4, wherein the determination part determines the combination having the highest calculated similarity, and also excludes other character string regions that are not included in the determined combination from the candidates.

6. The image processing device according to claim 4, wherein the calculation part calculates the similarity of each combination based on a similarity calculated for each character included in the character string region.

7. The image processing device according to claim 3, wherein the determination part determines the combination having the highest calculated similarity, and also excludes other character string regions that are not included in the determined combination from the candidates.

8. The image processing device according to claim 3, wherein the calculation part calculates the similarity of each combination based on a similarity calculated for each character included in the character string region.

9. The image processing device according to claim 2, wherein the determination part determines the combination having the highest calculated similarity, and also excludes other character string regions that are not included in the determined combination from the candidates.

10. The image processing device according to claim 2, wherein the calculation part calculates the similarity of each combination based on a similarity calculated for each character included in the character string region.

11. The image processing device according to claim 1, wherein the determination part determines the combination having the highest calculated similarity, and also excludes other character string regions that are not included in the determined combination from the candidates.

12. The image processing device according to claim 11, wherein the calculation part calculates the similarity of each combination based on a similarity calculated for each character included in the character string region.

13. The image processing device according to claim 1, wherein the calculation part calculates the similarity of each combination based on a similarity calculated for each character included in the character string region.

14. The image processing device according to claim 13, wherein the calculation part decreases the similarity to be calculated when the number of characters included in the target character string region is less than the number of characters assigned by the corresponding format character string.

15. The image processing device according to claim 1, wherein the setting part sets an initial value of the format character string from the recognition result, the recognition result being acquired by performing the character recognition to a reference image including a character string of a search target.

16. The image processing device according to claim 15, wherein the setting part receives a change of the initial value of the format character string from a user.

17. The image processing device according to claim 1, wherein the search condition is displayed using a sign corresponding to each character type.

18. The image processing device according to claim 1, wherein the format character string includes the assignment for excluding a specific character from the recognition target.

19. The image processing device according to claim 1, wherein the setting part previously retains the format character string, and sets the selected format character string according to the selection of the user to the search condition.

20. An image processing method for identifying a region in an input image by character recognition, the region coinciding with a predetermined search condition, the image processing method comprising:

receiving the search condition,
wherein the search condition includes assignments of plural format character strings, and
wherein each format character string includes an assignment of a character type or a specific character for each character of a recognition target;

extracting one or more character string regions as candidates from the input image;

calculating similarities for a plurality of combinations of character recognition result from the character string regions and the plural format character strings,
wherein a total number of the character recognition results included in each of the combinations is limited to a total number of the plural format character strings assigned via the setting part; and determining one of the combinations coinciding with the search condition based on the calculated similarities.

* * * * *